(12) United States Patent
Sethi et al.

(10) Patent No.: US 10,986,230 B1
(45) Date of Patent: Apr. 20, 2021

(54) METHOD AND APPARATUS TO CAPTURE, ANALYZE, ORGANIZE, AND PRESENT SUPPORT CHAT INFORMATION

(71) Applicant: DELL PRODUCTS, LP, Round Rock, TX (US)

(72) Inventors: Parminder Singh Sethi, Ludhian (IN); Avinash Vishwanath, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/685,353

(22) Filed: Nov. 15, 2019

(51) Int. Cl.
*H04M 3/00* (2006.01)
*H04M 3/51* (2006.01)
*H04M 3/53* (2006.01)
*H04L 12/58* (2006.01)
*G06Q 30/00* (2012.01)

(52) U.S. Cl.
CPC ........ *H04M 3/5191* (2013.01); *G06Q 30/016* (2013.01); *H04L 51/046* (2013.01); *H04M 3/5322* (2013.01)

(58) Field of Classification Search
CPC . H04M 3/5191; H04M 3/5183; H04M 3/5235
USPC .................................. 379/265.09, 265.13
See application file for complete search history.

(56) References Cited

U.S. PATENT DOCUMENTS

| | | |
|---|---|---|
| 2012/0041858 A1 | 2/2012 | Lewis |
| 2015/0347951 A1 | 12/2015 | Tamblyn et al. |
| 2016/0036869 A1* | 2/2016 | Logan ................ H04M 3/5141 379/265.09 |
| 2016/0378603 A1 | 12/2016 | Herzi et al. |
| 2018/0034720 A1 | 2/2018 | Bell et al. |
| 2019/0104649 A1 | 4/2019 | Clidaras et al. |
| 2019/0138287 A1 | 5/2019 | De Capoa et al. |
| 2019/0325897 A1* | 10/2019 | Liu ..................... H04M 3/5175 |

* cited by examiner

*Primary Examiner* — Rasha S Al Aubaidi
(74) *Attorney, Agent, or Firm* — Larson Newman, LLP

(57) ABSTRACT

An information handling system receives messages of a chat conversation, and may convert the messages into request and response pairs. The information handling system may also determine customer reaction determinations for respective ones of the request and response pairs, integrate the request and response pairs and the customer reaction determinations into a customer reaction timeline, and generate a chatbook from the customer reaction timeline.

20 Claims, 11 Drawing Sheets

METHOD AND APPARATUS TO CAPTURE, ANALYZE, ORGANIZE, AND PRESENT SUPPORT CHAT INFORMATION

FIELD OF THE DISCLOSURE

The present disclosure generally relates to information handling systems, and more particularly relates to capturing, analyzing, organizing and presenting support chat information.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system receives messages of a chat conversation, and may convert the messages into request and response pairs. The information handling system may also determine customer reaction determinations for respective ones of the request and response pairs, integrate the request and response pairs and the customer reaction determinations into a customer reaction timeline, and generate a chatbook from the customer reaction timeline.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
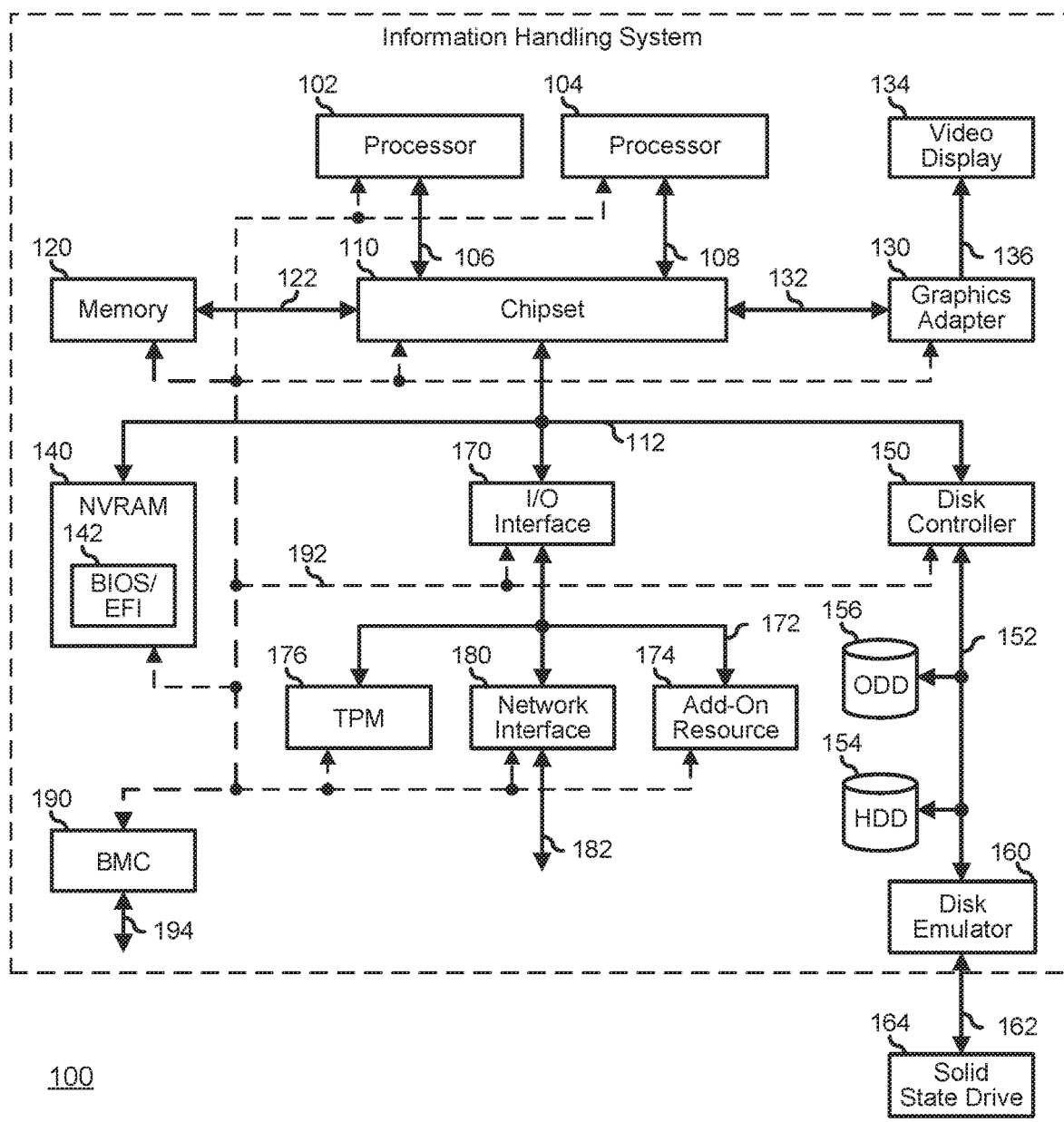
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics adapter 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics adapter 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I²C) interface, a Serial Peripheral Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

BMC 190 is connected by a management interface 192 to a plurality of system components, such as processor 102, processor 104, memory 120, chipset 110, graphics adapter 130, I/O interface 170, disk controller 150, NVRAM module 140, TPM 176, network interface 180, and add-on resource 174. BMC 190 is connected to an external management interface 194 for platform management by an external IHS.

Figure 2:
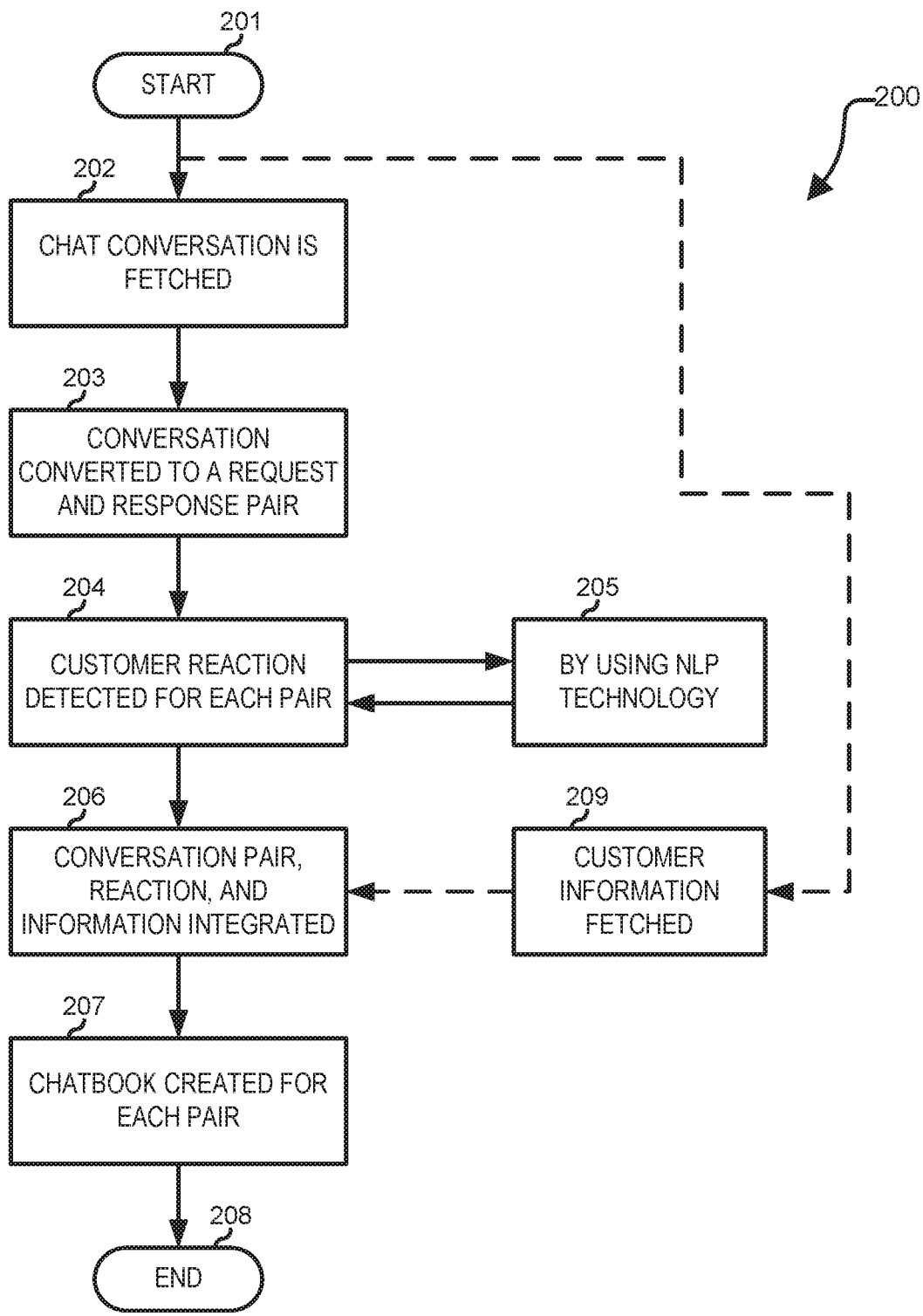
FIG. 2 is a flow diagram illustrating a method for capturing, analyzing, organizing, and presenting support chat information according to an embodiment of the present disclosure.

FIG. 2 shows a method 200 for capturing, analyzing, organizing, and presenting support chat information according to an embodiment of the present disclosure. Method 200 begins at block 201 and continues to block 202. At block 202, the elements of a chat conversation are obtained from a log of the chat conversation. As an example, the chat conversation may be a chat conversation between a customer and a technical support advisor. The elements may include, for example, short messages from the customer to the technical support advisor and short message from the technical support advisor to the customer. From block 202, method 200 continues to block 203. At block 203, the elements of the chat conversation are converted to a request and response pairs. Such conversion can be performed using natural language processing (NLP) and can take into account timestamps of the messages, including any time differences, as may be caused by transmission latencies, clock skew, etc., to assure that the request and response pairs are assembled in the proper order.

From block 203, method 200 can continue to block 204. At block 204, a customer reaction is determined for each request and response pair. As shown, flow proceeds bidirectionally between block 204 and block 205. At block 205, NLP is performed to gauge the customer reaction, facilitating the determination of the customer reaction at block 204. As an example, the customer reaction can be determined on a scale spanning from dissatisfaction to satisfaction, for example, numerically scored from a low value, such as zero or one, to a high value, such as ten. From block 204, method 200 continues to block 206. At block 206, the request and response pairs, the customer reaction values, and other information, such as best-practices recommendations, are integrated into an organized output product. Best-practices recommendations can be generated from analysis of chat conversations, as will be described in detail further below.

Along a parallel path from block 201, customer information is fetched at block 209, and such customer information can be used at block 206 for integration into the organized output product along with the aforementioned components of information obtained along the path from block 202 to 204 (including block 205). From block 206, method 200 continues to block 207. At block 207, a chatbook is created. As an example, the chatbook can display a page for each request and response pair established at block 203. From block 207, method 200 continues to block 208. At block 208, method 200 ends. As used herein, the term chatbook refers to a pictorial representation of a chat conversation, which may include features such as a customer depiction, a technical support advisor depiction, a customer reaction indicator, one or more customer chat communication bubbles, and one or more technical support advisor chat communication bubbles. The chat communication bubbles are text bubbles showing messages from the chat communication. The term text bubble, as used herein, refers to a pictorial representation of a message from an entity, the pictorial representation reciting the message and being tied by a visible linkage to a depiction of the entity.

Figure 3:
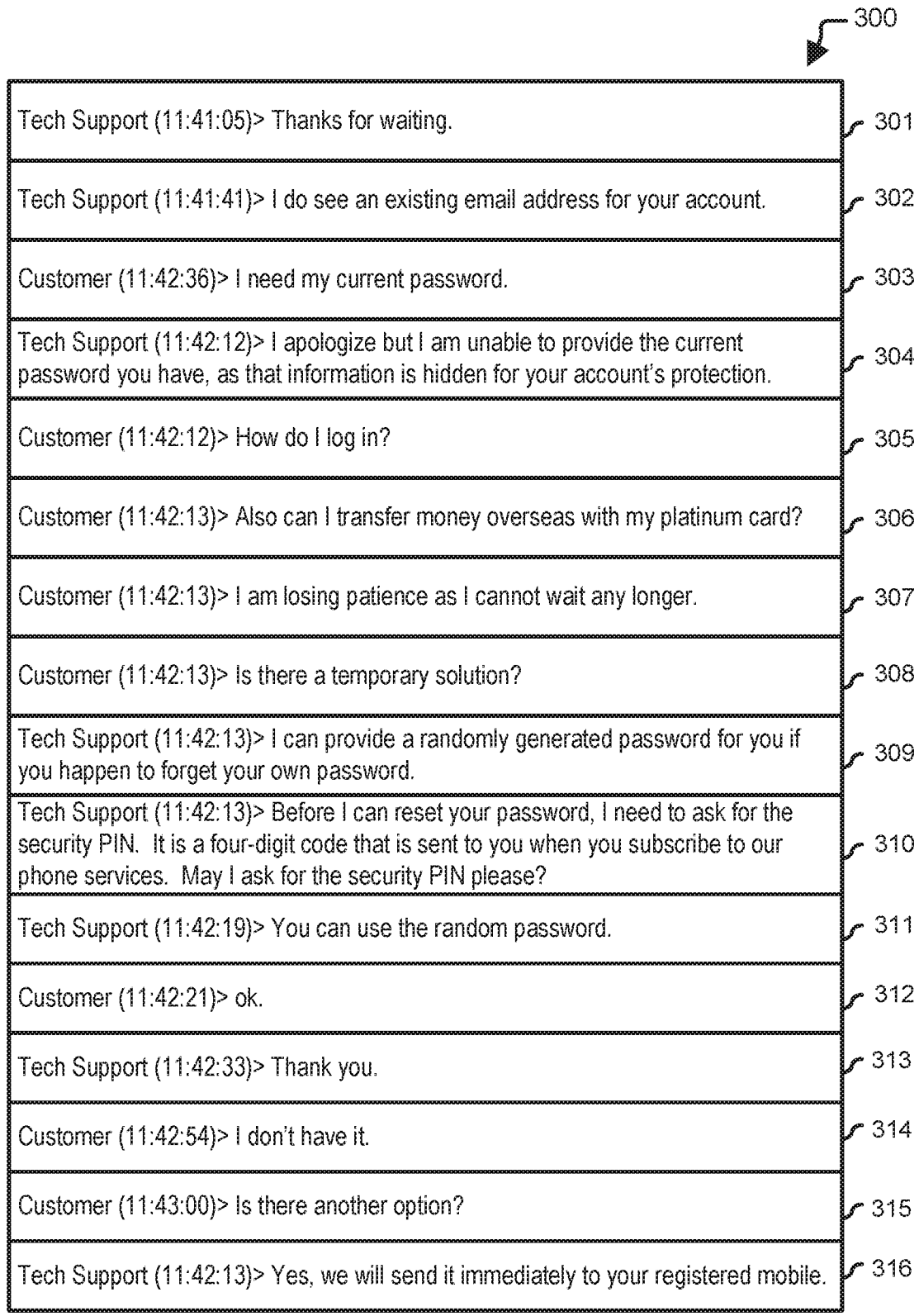
FIG. 3 is a block diagram illustrating a list of communications of a chat conversation between a customer and a technical support advisor according to an embodiment of the present disclosure.

FIG. 3 shows a list of communications of a chat conversation between a customer and a technical support advisor according to an embodiment of the present disclosure. List 300 comprises a plurality of communications occurring during a chat conversation. In communication 301, at a timestamp of 11:41:05, a tech support advisor states, "Thanks for waiting." In communication 302, at a timestamp of 11:41:05, the tech support advisor states, "I do see an existing email address for your account." In communication 303, at a timestamp of 11:42:36, a customer states, "I need my current password."

In communication 304, at a timestamp of 11:42:12, the tech support advisor states, "I apologize but I am unable to provide the current password you have, as that information is hidden for your account's protection." In communication 305, at a timestamp of 11:42:12, the customer states, "How do I log in?" In communication 306, at a timestamp of 11:42:13, the customer states, "Also can I transfer money overseas with my platinum card?" In communication 307, at a timestamp of 11:42:13, the tech support advisor states, "I am losing patience as I cannot wait any longer." In communication 308, at a timestamp of 11:42:13, the customer states, "Is there a temporary solution?" In communication 309, at a timestamp of 11:42:13, the tech support advisor states, "I can provide a randomly generated password for you if you happen to forget your own password."

In communication 310, at a timestamp of 11:42:13, the tech support advisor states, "Before I can reset your password, I need to ask for the security PIN. It is a four-digit code that is sent to you when you subscribe to our phone services. May I ask for the security PIN please?" In communication 311, at a timestamp of 11:42:19, the tech support advisor states, "You can use the random password." In communication 312, at a timestamp of 11:42:21, the customer states, "ok." In communication 313, at a timestamp of 11:42:33, the tech support advisor states, "Thank you." In communication 314, at a timestamp of 11:42:54, the tech support advisor states, "I don't have it." In communication 315, at a timestamp of 11:43:00, the customer states, "Is there another option?" In communication 316, at a timestamp of 11:42:13, the tech support advisor states, "Yes, we will send it immediately to your registered mobile."

Figure 4:
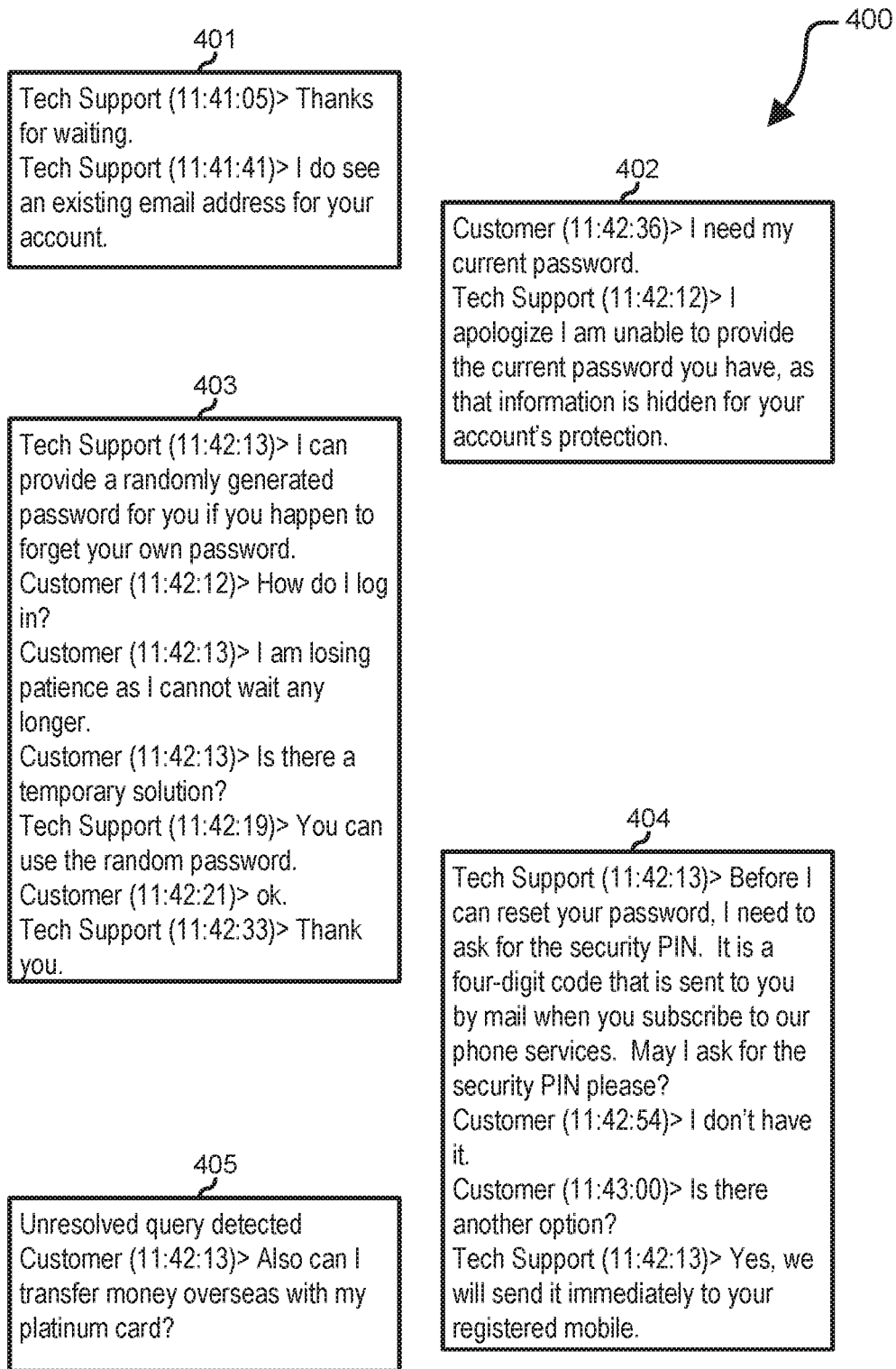
FIG. 4 is a block diagram illustrating request and response pairs identified and organized by a learning system on an information handling system according to an embodiment of the present disclosure.

FIG. 4 shows request and response pairs identified and organized by a learning system on an information handling system according to an embodiment of the present disclosure. The learning system can utilize natural language processing (NLP) for learning, as may be performed using, for example, machine learning (ML). Chat conversation 400 is divided into request and response pairs 401, 402, 403, 404, and 405. Request and response pair 401 provides the response to a customer's initial inquiry to the technical support advisor. Request and response pair 402 is a request and response concerning the user's current password. Request and response pair 403 is a request and response concerning a randomly generated password. Request and response pair 404 is a request and response concerning a security PIN and another option. Unpaired request 405 is detected to be an unresolved query.

Figure 5:
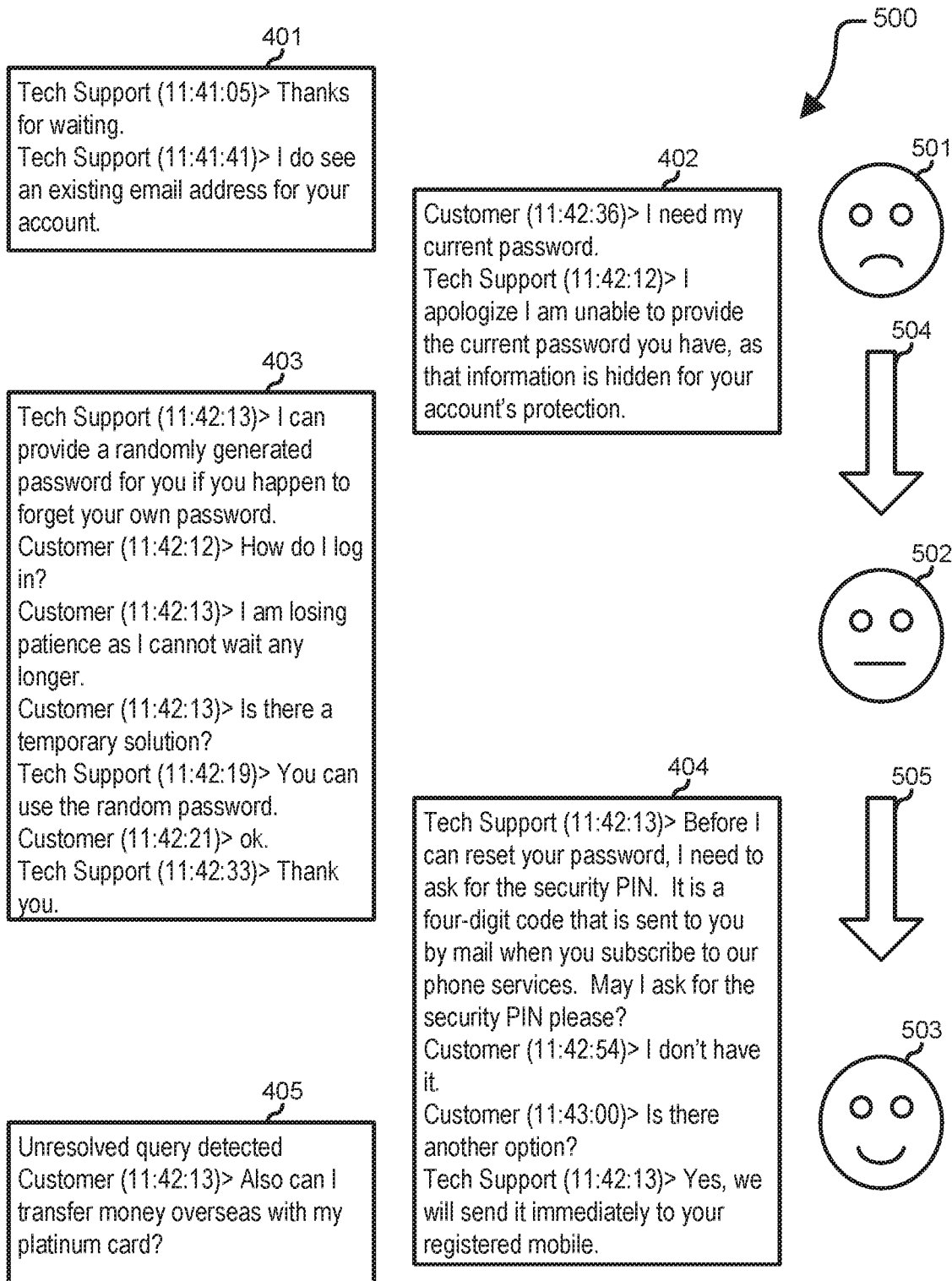
FIG. 5 is a block diagram illustrating customer reactions during the chat conversation identified and organized by a learning system on an information handling system according to an embodiment of the present disclosure.

FIG. 5 shows customer reactions during the chat conversation identified and organized by a learning system on an information handling system according to an embodiment of the present disclosure. Customer reaction determination output 500 comprises the request and response pairs of FIG. 4 with customer reaction determinations added to show the customer's reaction at points along the progress of the chat conversation. Dissatisfied customer reaction 501 is applied at request and response pair 402 based on the inability to provide the current password. Neutral customer reaction 502 is applied at request and response pair 403, as an alternative approach is considered. Satisfied customer reaction 503 is applied at request and response pair 404, as a solution is achieved. Transitions between customer reactions can also be applied. For example, transition 504 is applied to the transition from dissatisfied customer reaction 501 to neutral customer reaction 502, and transition 505 is applied to the transition from neutral customer reaction 502 to satisfied customer reaction 503.

Figure 6:
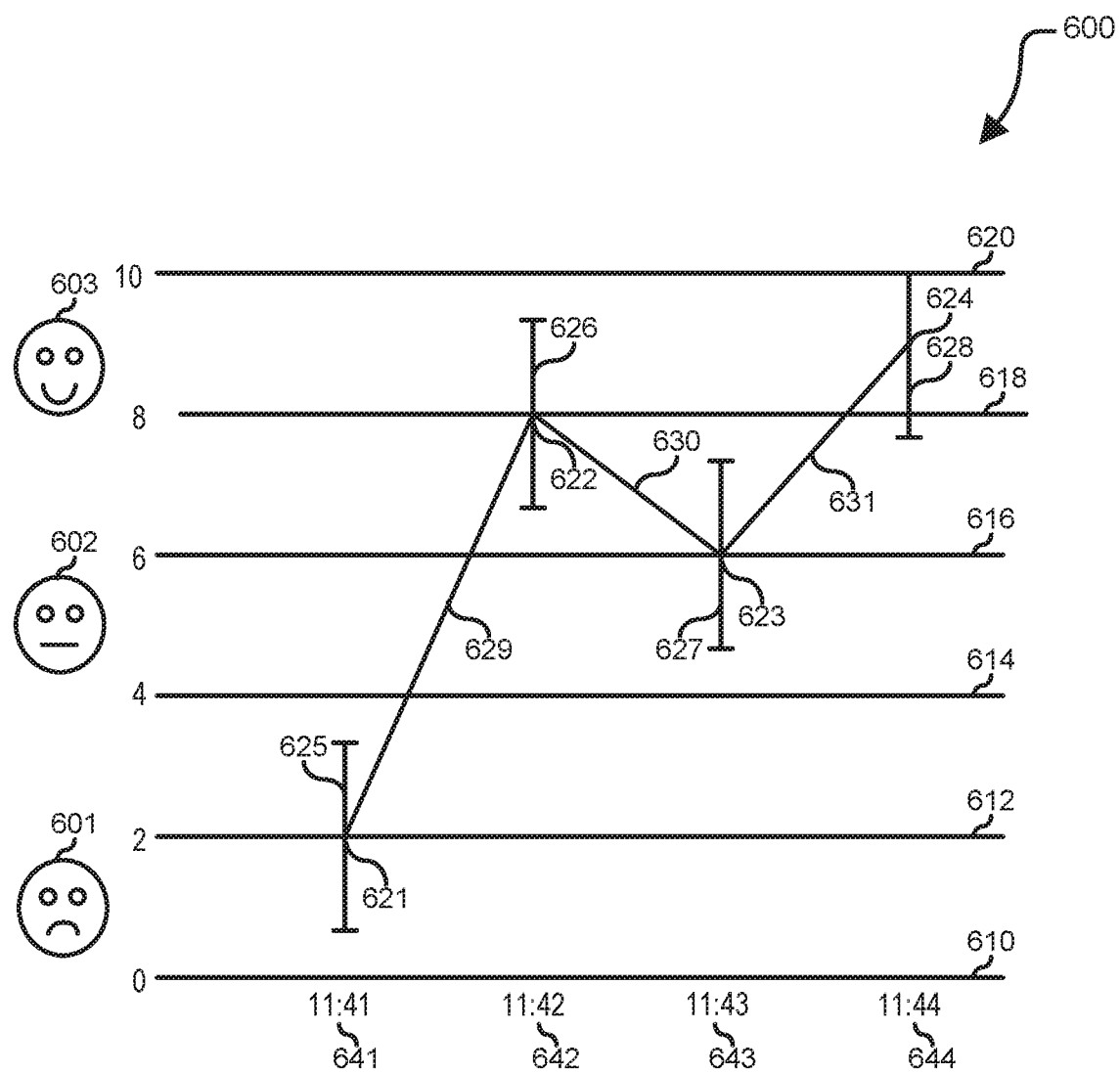
FIG. 6 is a graph illustrating a customer reaction timeline generated by a learning system on an information handling system according to an embodiment of the present disclosure.

FIG. 6 shows a customer reaction timeline generated by a learning system on an information handling system according to an embodiment of the present disclosure. Customer reaction timeline 600 is shown with respect to a plurality of customer reaction levels, including customer reaction level zero 610, customer reaction level two 612, customer reaction level four 614, customer reaction level six 616, customer reaction level eight 618, and customer reaction level ten 620. Other customer reaction levels, such as odd customer reaction levels one, three, five, seven, and nine lie between their respective adjacent even customer reaction levels. The customer reaction levels span a range from a customer dissatisfaction indicator 601, to a customer neutrality indicator 602, to a customer satisfaction indicator 603. Customer reaction timeline 600 is shown with respect to a time axis, including times 641, 642, 643, and 644.

A first point 621 is plotted at time 641 and customer satisfaction level two 612. A range bar 625 can show a possible range of customer satisfaction levels that first point

621 can represent. From first point 621, the customer reaction timeline rises along line 629 to a second point 622. Second point 622 is plotted at time 642 and customer satisfaction level 618. A range bar 626 can show a possible range of customer satisfaction levels that second point 622 can represent. From second point 622, the customer reaction timeline falls along line 630 to a third point 623. Third point 623 is plotted at time 643 and customer satisfaction level 616. A range bar 627 can show a possible range of customer satisfaction levels that third point 623 can represent. From third point 623, the customer reaction timeline rises along line 631 to a fourth point 624. Fourth point 624 is plotted at time 644 and customer satisfaction level nine between customer satisfaction level eight 618 and customer satisfaction level ten 620. A range bar 628 can show a possible range of customer satisfaction levels that fourth point 624 can represent.

Figure 7:
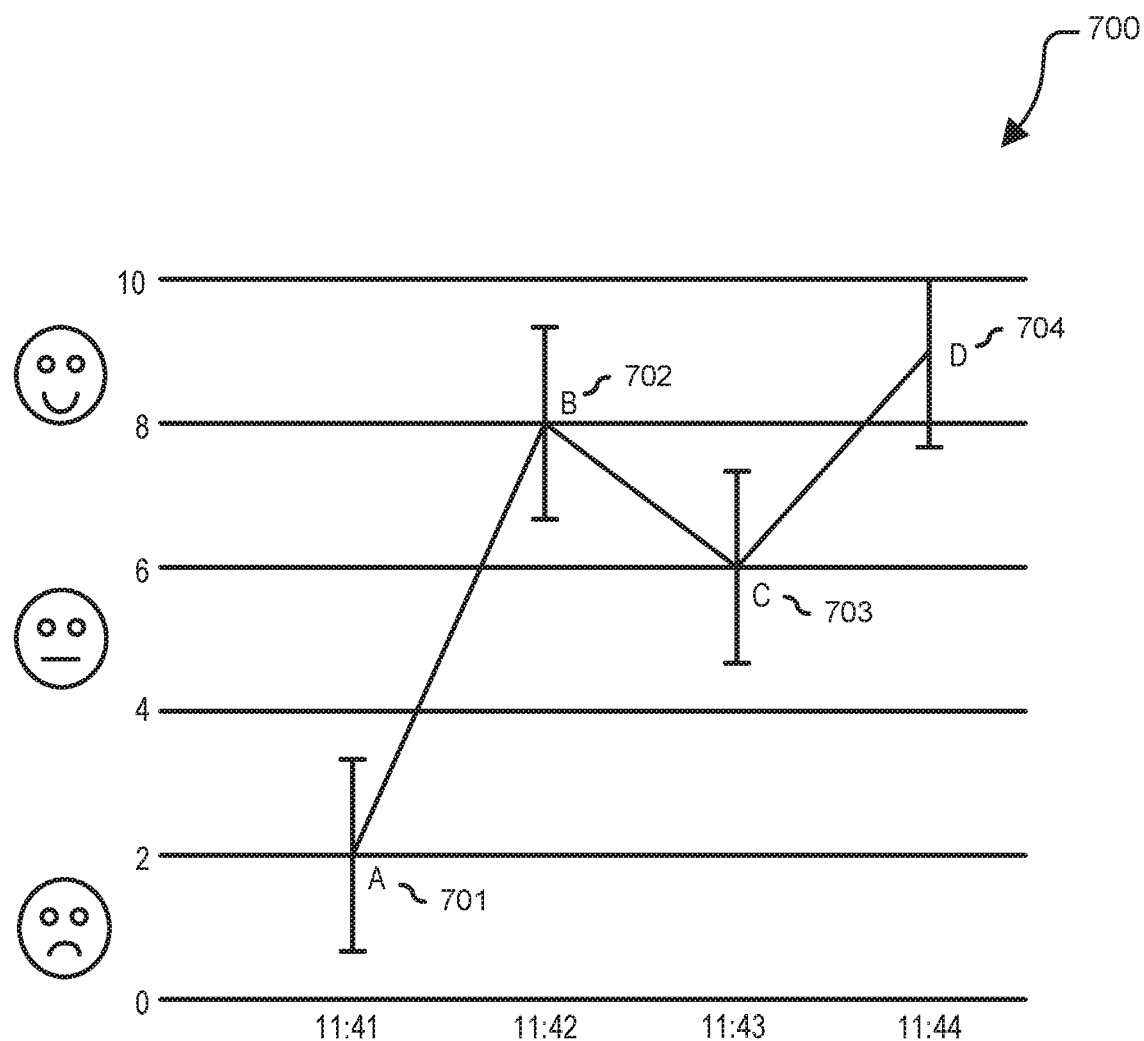
FIG. 7 is a graph illustrating a best-practice report generated by a learning system on an information handling system according to an embodiment of the present disclosure.

FIG. 7 shows a best-practice report generated by a learning system on an information handling system according to an embodiment of the present disclosure. FIG. 7 shows the same features at the same locations as FIG. 6, but with best-practices recommendations 701, 702, 703, and 704 added. A best-practices recommendation 701, labelled "A," is added at first point 621. A best-practices recommendation 702, labelled "B," is added at second point 622. A best-practices recommendation 703, labelled "C," is added at third point 623. A best-practices recommendation 704, labelled "D," is added at fourth point 624.

Best-practices recommendations to be provided in a best-practice report can be generated by the learning system. As an example, the learning system can use machine learning (ML) to analyze customer reaction timelines. For example, when a customer reaction changes positively, long-term potentiation (LTP) of an artificial neural network (ANN) can be used to strengthen the association of an abstraction obtained using natural language processing (NLP) of the portion of the chat conversation giving rise to the positive customer reaction change as a "best practice" for future provision in the context of future chat conversations where a similar abstraction is identified using NLP. The "best practice" need not by the superlatively "best" practice, but is defined as a favorable practice that is sought to be encouraged. Such a favorable practice is in contrast to a disfavorable practice that is sought to be discouraged. A disfavorable practice can be identified based on a negative customer reaction change. When a customer reaction changes negatively, long-term depression (LTD) of an ANN can be used to weaken the association of an abstraction obtained using NLP of the portion of the chat conversation giving rise to the negative customer reaction change as a "best practice." Over time, the LTP and LTD of an ANN can result in machine learning (ML) of "best practices" based on abstractions of portions of chat conversations obtained using NLP. The NLP can then perform NLP over future chat conversations to identify portions of those chat conversations where customer reaction changes occur, to obtain abstractions of semantic content of those portions, to match those abstractions to previously obtained similar abstractions, and to provide one or more best-practices recommendations generated from those previously obtained similar abstractions. Thus, a learning system in accordance with at least one embodiment can both generate best-practices recommendations and apply such best-practices recommendations to chat conversations, as shown in FIG. 7.

Figure 8:
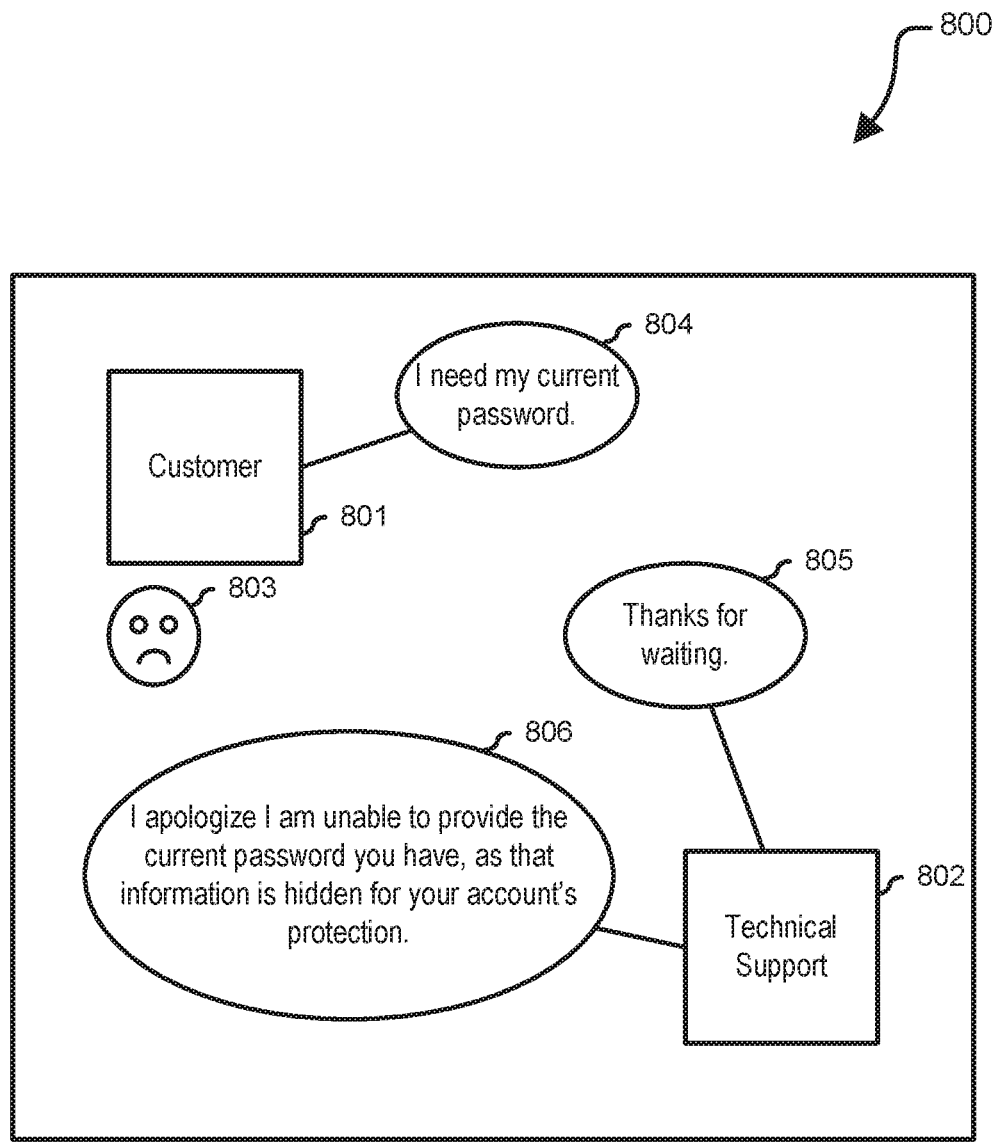
FIG. 8 is a block diagram illustrating a first page of a chatbook output produced by a learning system on an information handling system according to an embodiment of the present invention.

FIG. 8 shows a first page of a chatbook output produced by a learning system on an information handling system according to an embodiment of the present invention. Chatbook page 800 includes a customer depiction 801, a technical support advisor depiction 802, a customer satisfaction indicator 803, a customer chat communication bubble 804, and technical support advisor chat communication bubbles 805 and 806. The chat communication bubbles include messages from the chat communication, and the bubbles organize the messages in relation to their respective speakers, in this case, the customer and the technical support advisor.

Figure 9:
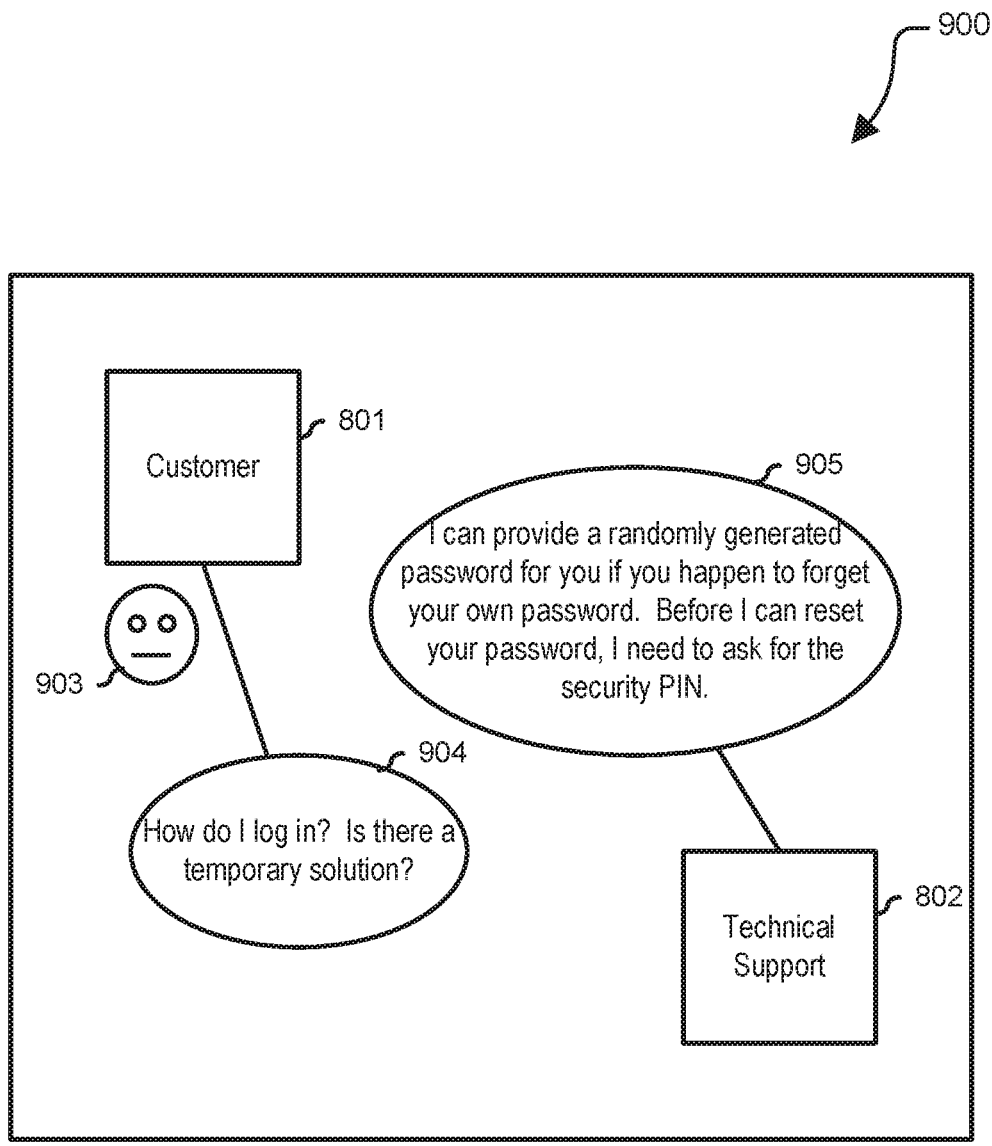
FIG. 9 is a block diagram illustrating a second page of a chatbook output produced by a learning system on an information handling system according to an embodiment of the present invention.

FIG. 9 shows a second page of a chatbook output produced by a learning system on an information handling system according to an embodiment of the present invention. Chatbook page 900 includes a customer depiction 801, a technical support advisor depiction 802, a customer satisfaction indicator 903, a customer chat communication bubble 904, and a technical support advisor chat communication bubble 905. As an example, the customer depiction 801 and the technical support advisor depiction 802 can be selected from a representative drawing or symbol or from a photograph of the respective individual.

Figure 10:
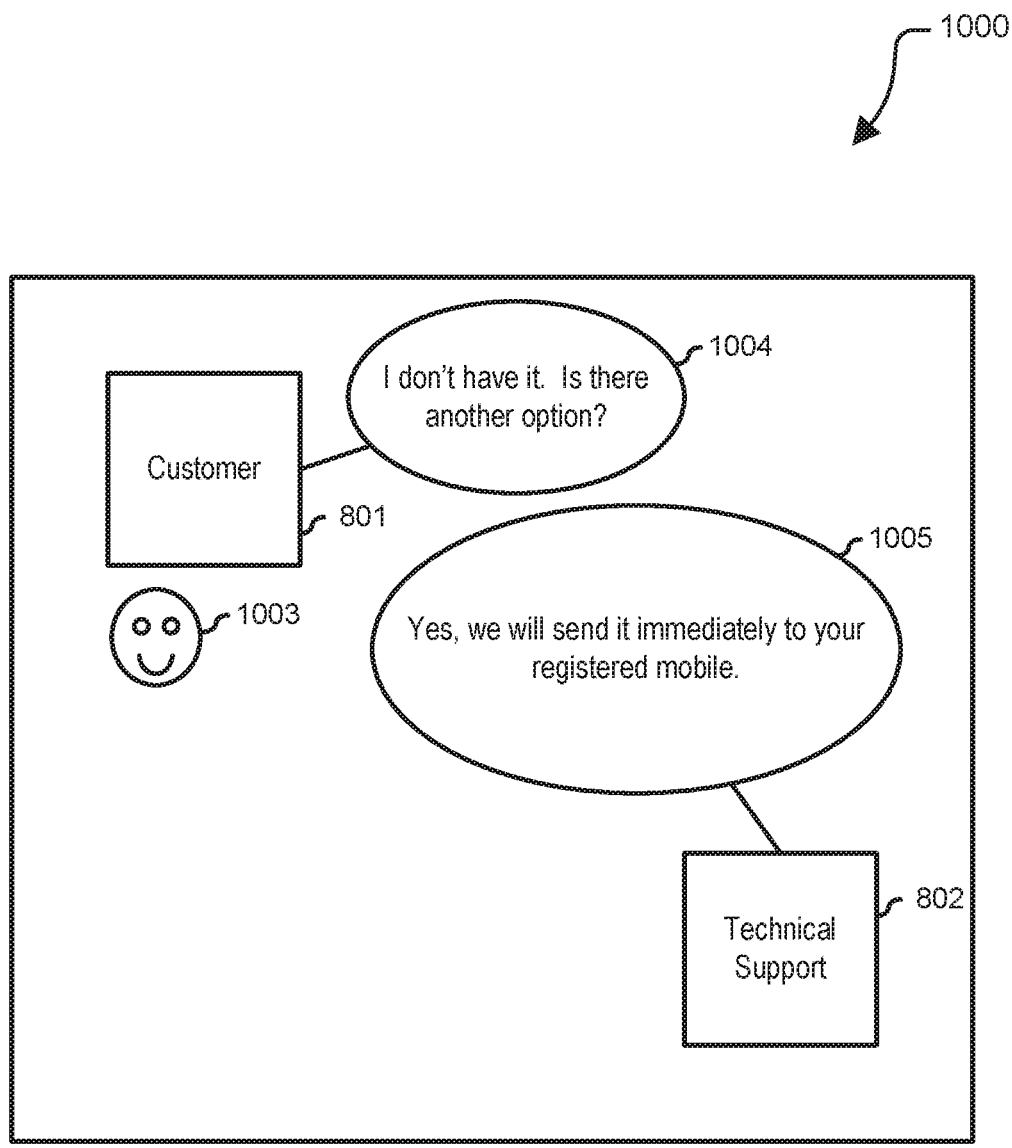
FIG. 10 is a block diagram illustrating a third page of a chatbook output produced by a learning system on an information handling system according to an embodiment of the present invention.

FIG. 10 shows a third page of a chatbook output produced by a learning system on an information handling system according to an embodiment of the present invention. Chatbook page 1000 includes a customer depiction 801, a technical support advisor depiction 802, a customer satisfaction indicator 1003, a customer chat communication bubble 1004, and a technical support advisor chat communication bubble 1005.

Figure 11:
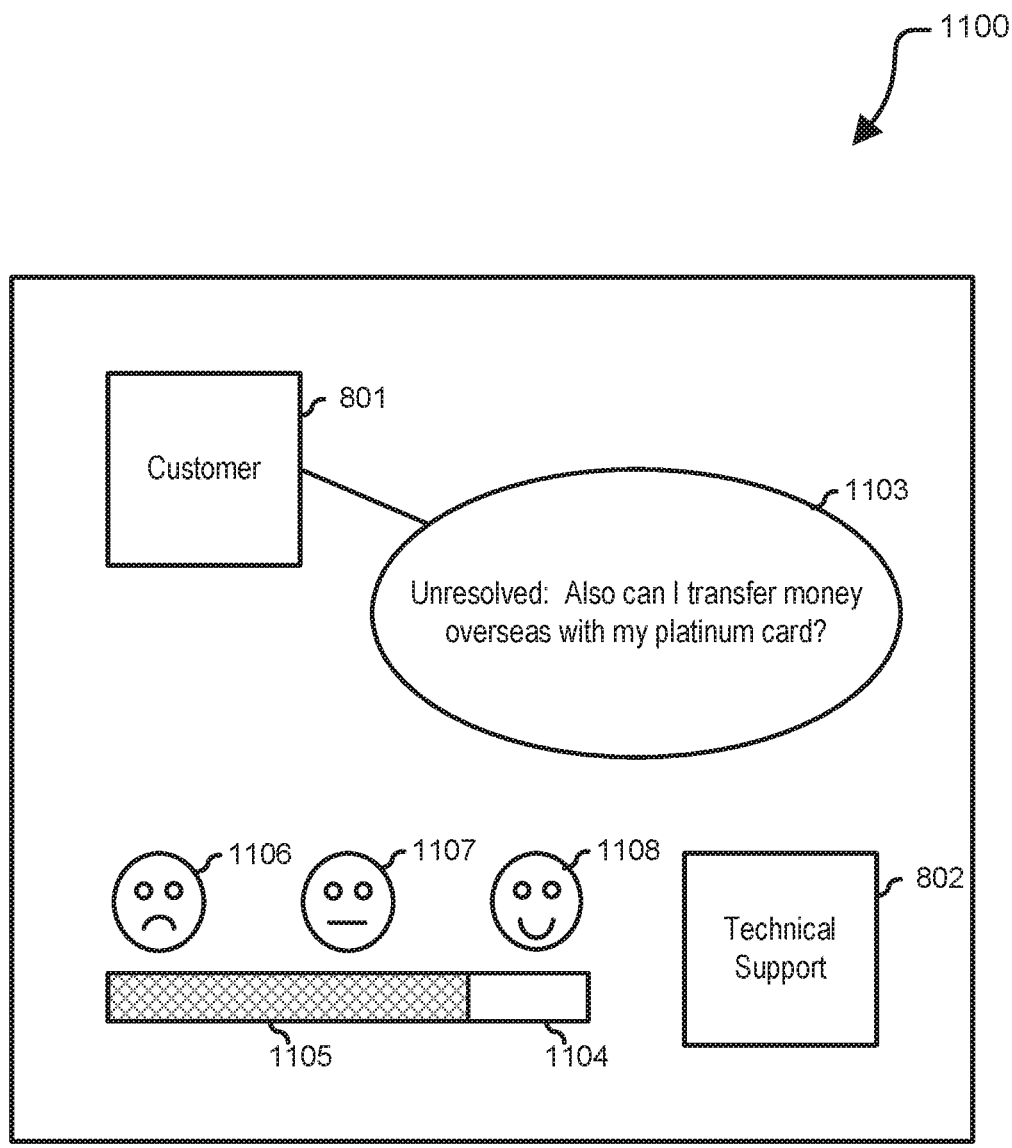
FIG. 11 is a block diagram illustrating a fourth page of a chatbook output produced by a learning system on an information handling system according to an embodiment of the present invention.

FIG. 11 shows a fourth page of a chatbook output produced by a learning system on an information handling system according to an embodiment of the present invention. Chatbook page 1100 includes a customer depiction 801, a technical support advisor depiction 802, a customer chat communication bubble 1003, and a customer satisfaction bar graph 1104 showing an achieved level 1105 of customer satisfaction with respect to customer reaction indicators 1106, 1107, and 1108. Customer reaction indicator 1106 is a customer dissatisfaction indicator. Customer reaction indicator 1107 is a customer neutrality indicator. Customer reaction indicator 1108 is a customer satisfaction indicator.

In providing quality service to the customers, chat facility is one of the most commonly used conversation medium by organizations. Across different domains, it is useful to revive the history of the chat conversations to understand the support requested by customers and also to understand the resolution provided by the support team. As an example, a TechSupport team may resolve or provide task-based information to solve the issues faced by the customers. A chat conversation for such activities can be maintained for any of multiple reasons. As one example, the chat conversation can serve as a data set for artificial intelligence and machine learning (AI/ML) algorithms. As another example, the chat conversation can be used as a source of information to obtain indirect feedbacks from the customer. As yet another example, the chat conversation can also be referred to by product stakeholders, at a later time, as a solution to the resolve issues arising from similar causes. But traditional approaches to saving chat conversations fall short of providing the desired benefits. As an example, a lack of information can exist in a chat conversation at any given point of time. For example, there may be a lack of information as to whether or not a customer is satisfied with the provided resolution at any given point of time. As another example, mere recordation, in absence of an embodiment of the method and apparatus described herein, of a chat conversation is not organized in an efficient manner to identify the consumer and to understand the previous conversations in a single view.

In accordance with at least one embodiment, a learning system implemented on an information handling system can create a timeline of the reaction of the customer across the conversation and then automatically report the good and bad practices followed in the conversation. This report can also be used as a teaching reference to guide others or can be converted into good and bad practices for training. In accordance with at least one embodiment, a process flow of the learning system is as described below. A customer initiates a conversation with technical support advisor team. Immediately, the system fetches the consumer information and the software and system used by the customer along with the current mood of the customer based on the initial texting style of the customer (e.g., by processing the message using NLP algorithms). The input message is parsed, and the request is analyzed and compared with the mood. After a few requests and responses, the conversation logs grow, and it becomes difficult to interpret them at a later point. To avoid this, the system categorizes the messages into request-response pairs. Now, the conversation in the form of request-response pairs, mood, and consumer information are integrated into a chatbook. If the user faces the same issue after a few days or months, it is very easy to read through the playbook and understand the previous conversations and suggest solutions in less time, which benefits the customer and the technical support advisor.

A sample chat conversation is set forth as individual messages below:

TechSupport (Sat Oct 2 11:41:05 EDT 2010)>Thanks for waiting.

TechSupport (Sat Oct 2 11:41:41 EDT 2010)>I do see here an existing email account with [company] as per checking your account.

Customer (Sat Oct 2 11:42:36 EDT 2010)>I need my current password.

TechSupport (Sat Oct 2 11:42:12 EDT 2010)>I apologize for I am unable to provide the current password you have, as that information is hidden for your account's protection.

Customer (Sat Oct 2 11:42:12 EDT 2010)>How do I login?

Customer (Sat Oct 2 11:42:13 EDT 2010)>Also can I transfer money overseas with my platinum card?

Customer (Sat Oct 2 11:42:13 EDT 2010)>I am losing patience as I cannot wait any longer?

Customer (Sat Oct 2 11:42:13 EDT 2010)>Is there a temporary solution?

TechSupport (Sat Oct 2 11:42:13 EDT 2010)>I can surely provide a randomly generated password for you if you happen to forget your own password.

Customer (Sat Oct 2 11:42:13 EDT 2010)>Before I can reset your password, I need to ask for the security pin. It is a 4 digit code that is sent to you by mail when you subscribe to our phone services. May I ask for the security pin please?

TechSupport (Sat Oct 2 11:42:19 EDT 2010)>You can use the random password.

Customer (Sat Oct 2 11:42:21 EDT 2010)>ok.

TechSupport (Sat Oct 2 11:42:33 EDT 2010)>Thank you.

Customer (Sat Oct 2 11:42:54 EDT 2010)>I don't have it.

Customer (Sat Oct 2 11:43:00 EDT 2010)>Is there another option?

Tech Support (11:42:13)>Yes, we will send it immediately to your registered mobile.

From the messages set forth above, request and response pairs are generated by the learning system. Customer reactions are captured during conversation, for example, using NLP of the interactions between the customer and the technical support advisor. A customer reaction timeline is generated.

The learning system can provide as an output a reaction timeline showing customer reaction across a span of time during the chat conversation. A reaction timeline can be created in real time on the fly, on the basis of the conversation occurring with the customer, or it can be created later. A customer reaction timeline can be used to assist a technical support advisor with on-the-fly remediation during a chat conversation. The timeline can inform the technical support advisor of the reaction of the customer as resolution or steps to resolution progress, and the timeline, with best-practices recommendations, can guide the technical support advisor toward satisfactory resolution. As indirect feedback is collected during the chat timeline, a best-practices report can be generated, which can eliminate a customer survey at the close of the chat. The indirect feedback can guide the implementation of best-practices recommendations. The best-practices recommendations can be provided in a goal-based manner, for example, toward attaining a goal of keeping the reaction index above level 8 across the duration of the chat conversation. A best-practices report can be converted into training material, for example, to provide training on how to handle a customer's anger, how to handle a situation when a customer suddenly becomes angry following previously calm reactions, etc. An automatic chatbook can be created at the end of the conversation. The chatbook can provide easy retrieval of the problem and the associated solutions. The chatbook can eliminate the need for parsing an entire conversation to obtain desired information within the conversation.

In accordance with at least one embodiment, a learning system as described herein can be extended to use for a voice-based support system. Verbal cues, such as variation of the depth of the voice of customers, can be used as a factor in characterizing the response of a customer. In accordance with at least one embodiment, a learning system as described herein can be used to implement an automated system for performing the role of the technical support advisor. The automated system can be referred to as a chatbot. Pages of the chatbook provide information to enable the chatbot to provide resolutions on the fly.

In accordance with at least one embodiment, a method comprises receiving, at an information handling system (IHS), a plurality of messages of a chat conversation; converting, at the IHS, the plurality of messages into request and response pairs; determining, at the IHS, customer reaction determinations for respective ones of the request and response pairs; integrating, at the IHS, the request and response pairs and the customer reaction determinations into a customer reaction timeline; and generating, at the IHS, a chatbook from the customer reaction timeline. In accordance with at least one embodiment, the determining the customer reactions determinations is performed using natural language processing (NLP) at the IHS. In accordance with at least one embodiment, the method further comprises applying best-practices recommendations at points along the customer reaction timeline. In accordance with at least one embodiment, the chatbook comprises a plurality of pages, the pages corresponding, respectively, to the request and response pairs. In accordance with at least one embodiment, the method further comprises identifying an unresolved query among the messages, wherein the unresolved query was not resolved during the chat conversation. In accordance with at least one embodiment, the chatbook comprises a customer reaction indicator, the customer reaction indicator selected from a group consisting of a customer dissatisfaction indicator, a customer neutrality indicator, and a customer satisfaction indicator. In accordance with at least one embodiment, the customer reaction timeline is generated in real time during the chat conversation.

In accordance with at least one embodiment, an information handling system (IHS) comprises memory; and a processor coupled to the memory, the processor configured to receive a plurality of messages of a chat conversation, to convert the plurality of messages into request and response pairs, to determine customer reaction determinations for respective ones of the request and response pairs, to integrate the request and response pairs and the customer reaction determinations into a customer reaction timeline, and to generate a chatbook from the customer reaction timeline. In accordance with at least one embodiment, the customer reactions determinations are performed using natural language processing (NLP) at the IHS. In accordance with at least one embodiment, the processor is further configured to apply best-practices recommendations at points along the customer reaction timeline. In accordance with at least one embodiment, the chatbook comprises a plurality of pages, the pages corresponding, respectively, to the request and response pairs. In accordance with at least one embodiment, the processor is further configured to identify an unresolved query among the messages, wherein the unresolved query was not resolved during the chat conversation. In accordance with at least one embodiment, the chatbook comprises a customer reaction indicator, the customer reaction indicator selected from a group consisting of a customer dissatisfaction indicator, a customer neutrality indicator, and a customer satisfaction indicator. In accordance with at least one embodiment, the customer reaction timeline is generated in real time during the chat conversation.

In accordance with at least one embodiment, a method comprises receiving, at an information handling system (IHS), a plurality of messages of a chat conversation; converting, at the IHS, the plurality of messages into request and response pairs; determining, at the IHS, customer reaction determinations for respective ones of the request and response pairs; integrating, at the IHS, the request and response pairs and the customer reaction determinations into a customer reaction timeline; and generating, at the IHS, a chatbook from the customer reaction timeline, the chatbook expressing the request and response pairs as text bubbles. In accordance with at least one embodiment, the determining the customer reactions determinations is performed using natural language processing (NLP) at the IHS. In accordance with at least one embodiment, the method further comprises applying best-practices recommendations at points along the customer reaction timeline. In accordance with at least one embodiment, the chatbook comprises a plurality of pages, the pages corresponding, respectively, to the request and response pairs. In accordance with at least one embodiment, the method further comprises identifying an unresolved query among the messages, wherein the unresolved query was not resolved during the chat conversation. In accordance with at least one embodiment, the chatbook comprises a customer reaction indicator, the customer reaction indicator selected from a group consisting of a customer dissatisfaction indicator, a customer neutrality indicator, and a customer satisfaction indicator.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
receiving, at an information handling system (IHS), a plurality of messages of a chat conversation;
converting, at the IHS, the messages into request and response pairs;
determining, at the IHS, customer reaction determinations for respective ones of the request and response pairs;
integrating, at the IHS, the request and response pairs and the customer reaction determinations into a customer reaction timeline; and
generating, at the IHS, a chatbook from the customer reaction timeline, wherein the chatbook is created specifically for the chat conversation, wherein the chatbook includes a plurality of pages corresponding, respectively, to the request and response pairs.

2. The method of claim 1, wherein the determining the customer reactions determinations is performed using natural language processing (NLP) at the IHS.

3. The method of claim 1 further comprising:
applying best-practices recommendations at points along the customer reaction timeline.

4. The method of claim 1, further comprising:
identifying an unresolved query among the messages, wherein the unresolved query was not resolved during the chat conversation.

5. The method of claim 1, wherein the chatbook comprises a customer reaction indicator, the customer reaction indicator selected from a group consisting of a customer dissatisfaction indicator, a customer neutrality indicator, and a customer satisfaction indicator.

6. The method of claim 1, wherein the customer reaction timeline is generated in real time during the chat conversation.

7. An information handling system (IHS) comprising:
memory; and
a processor coupled to the memory, the processor configured to receive a plurality of messages of a chat conversation, to convert the messages into request and response pairs, to determine customer reaction determinations for respective ones of the request and response pairs, to integrate the request and response pairs and the customer reaction determinations into a customer reaction timeline, and to generate a chatbook from the customer reaction timeline, wherein the chatbook is created specifically for the chat conversation, wherein the chatbook includes a plurality of pages corresponding, respectively, to the request and response pairs.

8. The IHS of claim 7, wherein the customer reactions determinations are performed using natural language processing at the IHS.

9. The IHS of claim 7, wherein the processor is further configured to apply best-practices recommendations at points along the customer reaction timeline.

10. The IHS of claim 7, wherein the processor is further configured to identify an unresolved query among the messages, wherein the unresolved query was not resolved during the chat conversation.

11. The IHS of claim 7, wherein the chatbook comprises a customer reaction indicator, the customer reaction indicator selected from a group consisting of a customer dissatisfaction indicator, a customer neutrality indicator, and a customer satisfaction indicator.

12. The IHS of claim 7, wherein the customer reaction timeline is generated in real time during the chat conversation.

13. A method comprising:
receiving, at an information handling system (IHS), a plurality of messages of a chat conversation;
converting, at the IHS, the messages into request and response pairs;
determining, at the IHS, customer reaction determinations for respective ones of the request and response pairs;
integrating, at the IHS, the request and response pairs and the customer reaction determinations into a customer reaction timeline; and
generating a chatbook from the customer reaction timeline, wherein the chatbook is created specifically for the chat conversation, the chatbook expressing the request and response pairs as text bubbles.

14. The method of claim 13, wherein the determining the customer reactions determinations is performed using natural language processing at the IHS.

15. The method of claim 13 further comprising:
applying best-practices recommendations at points along the customer reaction timeline.

16. The method of claim 13, wherein the chatbook comprises a plurality of pages, the pages corresponding, respectively, to the request and response pairs.

17. The method of claim 13 further comprising:
identifying an unresolved query among the messages, wherein the unresolved query was not resolved during the chat conversation.

18. The method of claim 13, wherein the chatbook comprises a customer reaction indicator, the customer reaction indicator selected from a group consisting of a customer dissatisfaction indicator, a customer neutrality indicator, and a customer satisfaction indicator.

19. The method of claim 13 wherein the text bubbles comprise one or more customer chat communication bubbles.

20. The method of claim 19 wherein the text bubbles comprise one or more technical support advisor chat communication bubbles.

* * * * *